United States Patent [19]

Campbell

[11] 4,234,930
[45] Nov. 18, 1980

[54] INTERLEAVED BINARY CODED SIGNAL TRANSLATION DEVICE

[75] Inventor: Russell Campbell, Kanata, Canada

[73] Assignee: Her Majesty the Queen in right of Canada, Ottawa, Canada

[21] Appl. No.: 928,972

[22] Filed: Jul. 28, 1978

[30] Foreign Application Priority Data

Apr. 25, 1978 [CA] Canada .................................. 301883

[51] Int. Cl.³ .......................... G06F 15/31; H04B 1/12
[52] U.S. Cl. ...................................... 364/724; 375/80
[58] Field of Search ............... 364/742, 728, 821, 825; 325/42

[56] References Cited

U.S. PATENT DOCUMENTS

| | | | |
|---|---|---|---|
| 3,487,203 | 12/1969 | Lindsay et al. ................... | 364/724 X |
| 3,634,765 | 1/1972 | Gutleber ............................... | 325/42 |
| 3,993,956 | 11/1976 | Gilmore et al. .................. | 364/724 X |
| 4,025,772 | 5/1977 | Constant .......................... | 364/724 X |
| 4,044,241 | 8/1977 | Hatley, Jr. ......................... | 364/724 |

Primary Examiner—Jerry Smith
Attorney, Agent, or Firm—Schwartz, Jeffery, Schwaab, Mack, Blumenthal & Koch

[57] ABSTRACT

Apparatus for improved translation of an interleaved binary coded signal heavily masked by noise comprising a plurality of delay line type matched binary code filters for receiving the interleaved signal, preferably of the surface acoustic wave type. Each filter is matched to one of the binary codes from which the interleaved signal is formed. The output signal of each matched filter is split and passed through a delay means and the output of each delay means is summed with the output of each matched filter. The resulting signals can be further processed by adding or multiplying.

13 Claims, 3 Drawing Figures

INTERLEAVED BINARY CODED SIGNAL TRANSLATION DEVICE

This invention relates to a device and system which is particularly useful for translating long binary coded signals in the presence of high noise levels and/or jamming signals.

Correlators or matched filter receivers are used in various communications systems and particularly in spread spectrum systems utilizing a pseudorandom binary code to "spread" the bandwidth required to transmit and receive the desired data signal. Such systems are used in communications links, ranging sytems and position location systems.

Frequently, by design or necessity, the transmitted signals are masked by noise to the extent that they cannot be demodulated on a bit by bit basis, and may even be undetectable. However, these signals can be detected by matched filters which process more than one bit of signal at a time. The output of a matched filter is a maximum at the instant of time that the signal for which the filter is matched has completely entered the matched filter. In the case of a signal which is made up of a bi-phase shift keyed signal, for example, the output of a matched filter matched to N bits is N times that of a filter matched to 1 bit. Stated another way, if the signal-to-noise ratio of 1 bit of the input signal is S, then the output of the matched filter matched to N bit at the instant at which the signal has entered the matched filter is NS. Thus the enhancement of the signal-to-noise ratio of the received signal is directly proportional to the number of bits to which the matched filter is matched.

Thus, to extract the signal buried deep in noise, in theory one need only build a matched filter matched to a sufficient number of bits (as well as to the bit pattern). In practice, however, this is not possible. In the case of surface acoustic wave (SAW) devices, the practical limit is 500 to 1,000 bits before cost and complexity renders such implementation unfeasible. Using charge coupled devices (CCD) the limit is higher, although the technology has not stabilized.

One method of effectively increasing the "length" of a SAW matched filter is to add the incoming code M times and to delay the output of the device by such length of time that if the delayed output were added to the output of the matched filter, the autocorrelation peaks would be summed together coherently. A delay and summing carried out M times would result in an autocorrelation peak of M times that of a single matched filter output for a particular binary code in question. Although the noise also adds with each recirculation, it does so incoherently. The effective increase in signal-to-noise ratio of the input signal is MN, where M is the number of recirculations and N is the number of bits in the code. Thus a matched filter receiver can be implemented for a code MN bits long by using a matched filter MN bits long, or for a code N bits long repeated M times using a matched filter N bits long and a suitable delay line and summing means. The matched filters are matched to individual codes in their interleaved state.

The disadvantage of this scheme is that in a noisy environment, it is difficult to distinguish between the jth and j+1 or j−1th recirculated autocorrelation. This difficulty increases as the number of recirculations increase. For example, if two recirculators are used, it is relatively easy to distinguish between the first and second recirculated output since one is twice as large as the other. However, for a large number of recirculations, for example 100, there is relatively little difference between say the 98th recirculated output and the 100th. In the presence of noise, the 88th peak could easily appear to exceed the 100th and a false detection of the signal could occur by a threshold device set to detect the 100 recirculated autocorrelation peak which corresponds to the desired signal.

This problem can be partially alleviated by some sort of synchronization circuits. However, these impose limitations on the communication system and reduce its signalling efficiency over that achievable with one long code.

The present invention provides means for translating a received signal without the above required synchronization, and for providing an output signal which, at a particular time, exceeds a given threshold by a significant and improved degree.

Further, the present invention provides means for translating this signal at a significantly reduced cost and using a simplified form of system than would otherwise be required.

In the present invention the form of the signal which is to be received is known, but not the time of arrival. The preferred signal is an interleaved form of at least a pair of binary coded signals. Upon the reception of the presence of the interleaved signals, logic apparatus which is not part of the present invention can determine that the received signal is representative of a binary 1 or 0.

Since the form of the received signal is known prior to its reception, but not whether its presence exists, the present apparatus provides an improved means for determining the presence or absence of the signal. A special filtering and summing means is provided for uniquely identifying the binary coded components of the interleaved signal, whereupon further logical analysis can be made.

The invention in general is an apparatus for translation of an interleaved binary coded signal, comprising a plurality of delay line type matched binary code filters, for receiving the interleaved signal, each filter being matched to one of the binary codes (interleaved state) from which the interleaved signal is formed, and means for summing the output signals of each of the matched filters to produce the translated signal.

A better understanding of the invention will be obtained by reference to the detailed description below, to the following drawings, in which.

Figure 1:
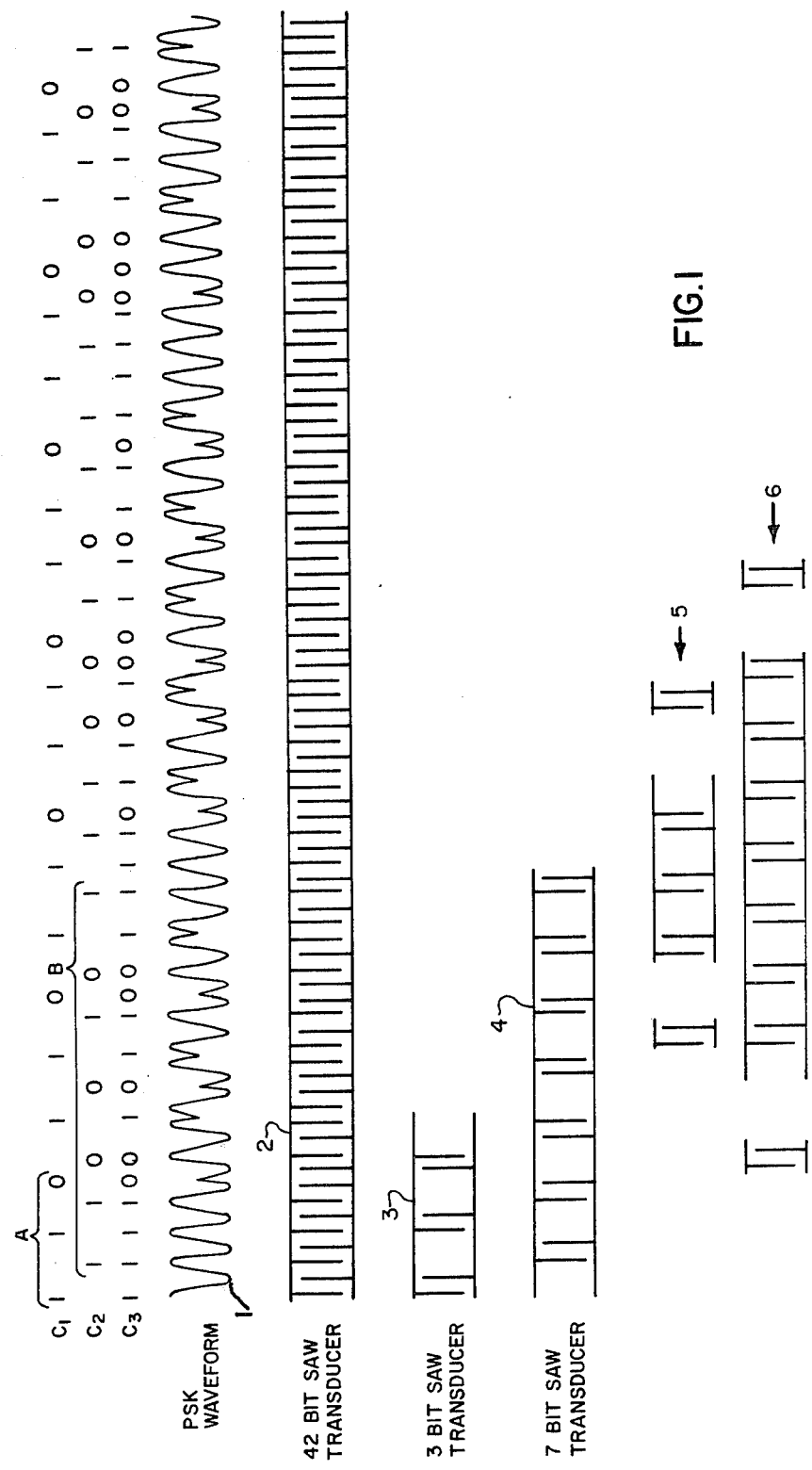
FIG. 1 depicts binary coded signal waveforms, a prior art surface acoustic wave filter and the corresponding filters according to the present invention.

It is desired to receive a signal comprising the interleaved binary coded signals shown as C1 and C2 in FIG. 1. Signal C1 is comprised of a maximal linear pseudo-noise code 110 (bracketed at A) continuously repeated. Signal C2 is a maximal linear pseudo-noise code bracketed at B, continuously repeating. Signal C1 is interleaved with signal C2 to provide the signal C3. However, the codes are not restricted to maximal linear pseudo-noise types.

It is clear that the code forming signal C1 contains 3 bits, and the code forming signal C2 contains 7 bits. Thus the code of signal C2 must be repeated 3 times, and the code of signal C1 must be repeated 7 times, within a single period of code C3. Each of the C1 and C2 signals therefore contain 21 bits before there is a repetition in step. Since each of the bits of signals C1 and C2 are interleaved to form signal C3, one period of signal C3 contains 42 bits before it repeats itself.

It can therefore be considered that signal C1 is formed of words 3 bits long, signal C2 is formed of words 7 bits long, but the combined signal C3 contains repeating words each of which are 42 bits long. It is the latter signal which is to be received and its reception signified in the present invention.

It should be noted that a filter which is matched to receive the 42 bits is not overly complex, physically relatively large, or expensive. However, if longer code word sizes are used the length of the C3 signal word increases, and the required matched filter could become particularly complex and expensive.

For example, the code length of the C3 signal is 2 times the length of the C1 word times the length of the C2 word. If the length of the C1 word equals 31 bits and the length of the C2 word is 63 bits, then the length of the C3 word is $3 \times 31 \times 63 = 3,906$ bits. The cost of a surface acoustics wave filter of such length, if at all possible to manufacture, would be prohibitively expensive.

The signal C3 is preferably phase shift key modulated or frequency shift key modulated to form a transmitted waveform signal 1.

A prior art approach to receiving signal 1 is to provide a surface acoustic wave (SAW) filter 2, which contains sufficient capacity to receive the required 42 bits of the example of FIG. 1. Since this filter matches the input signal bit for bit, once the input signal has been received an output signal is produced. The output signal, if exceeding a predetermined threshold, can be used to indicate the presence of the 42 bit signal. The output signal is thereupon applied to logic circuitry which does not form the subject of the present invention.

In direct sequence spread spectrum systems for which the present invention is particularly suited, system performance improves with code length. Consequently much effort and expense usually is extended to implement matched filters for the longest codes possible, for instance, in excess of 1,000 bits. It is extremely difficult to obtain SAW filters of this length, and consequently the cost of such flters is excessive, for instance in the range of several thousand dollars.

SAW filters are described in detail in the publications SCIENTIFIC AMERICAN, 1972, pages 50–68 in an article by G. S. Kino and A. Shaw entitled "Acoustic Surface Waves", and in IEEE SPECTRUM, August 1971, pages 21–35, in an article by G. S. Kino and H. Matthews entitled "Signal Processing in Acoustic Surface-Wave Devices".

The present invention substantially reduces the requirement for long and complex SAW matched filters. In the present invention individual SAW filters are utilized in parallel, each filter of which matches the individual codes from which the interleaved code is formed.

In FIG. 1, SAW filter 3 contains 3 bit capacity and is fabricated to match the 3 bit code A. However, the spacing between each of the filter finger pairs is such as to sense the specific time of the individual interleaved bits of the 3 bit code of signal C1. For the two interleaved code example, the spacing between the SAW filter finger pairs is twice the distance between the finger pairs in SAW filter 2.

In some instances, this may be three fingers per bit, but use thereof in this structure would be obvious to a person skilled in the art.

Also the matched filter has been depicted for the case where one cycle of the carrier frequency is used for each bit. Several cycles of carrier can used to transmit 1 bit.

Similarly, SAW filter 4 matches the 7 bit component of signal C3 which is provided by the interleaved code B of signal C2. However it should be noted that the finger pairs of SAW filter 4 are located in the gaps between the finger pairs of SAW filter 3, and are themselves spaced at double the normal distance between finger pairs so as to match the timing of the code portion B of the C2 signal as a signal C3.

Signal C3 is applied to both filters 3 and 4 in parallel, and it has been found that each matches and provides an output signal responsive to the individual code components A and B in the interleaved signal C3.

Reference numerals 5 and 6 depict more closely, practical 3 and 7 bit SAW filters respectively. Each contains launching transducers at each side of the central 3 and 7 bit sensing transducers which will be recognizable to a person skilled in the art.

The spacing between the launching transducers and the adjacent set of fingers of each of the filters corresponds to the timing between the individual interleaved codes. It may be seen that the first set of fingers for the 3 bit SAW filter is closer to the lefthand launching transducer than the first set of fingers for the 7 bit SAW filter, reflecting that the position of the first bit of the 3 bit code is earlier in time than the first bit of the 7 bit code. The two filters typically are disposed on different substances.

Figure 2:
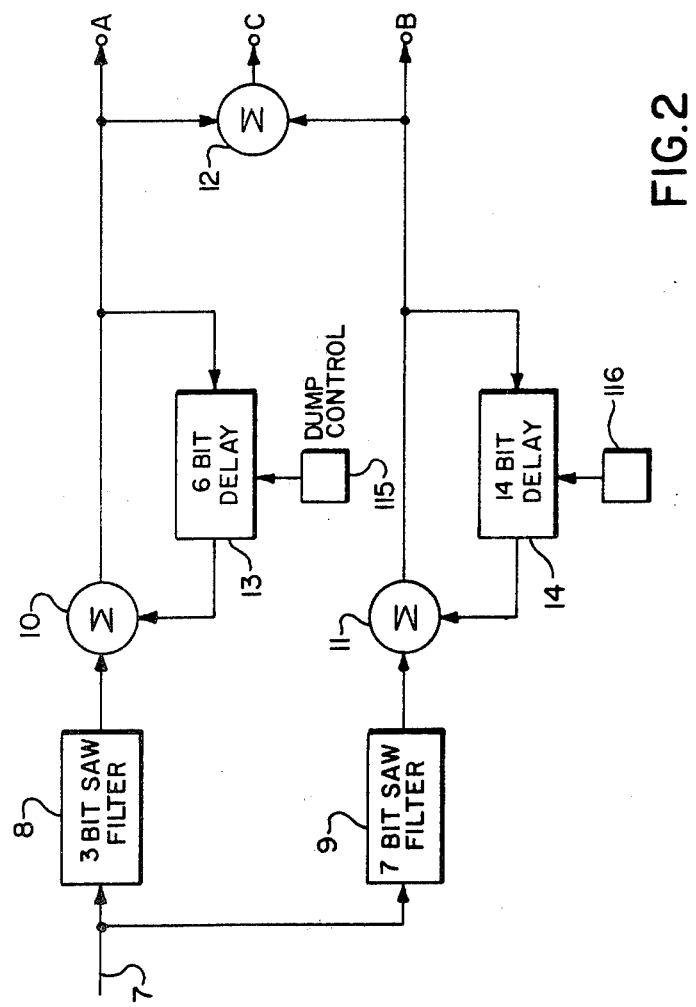
FIG. 2 is a block diagram of the circuit of the present invention; which is used with the inventive filters.

Turning now to FIG. 2, phase shift keyed signal 1 is applied via input lead 7 to the inputs of the two SAW filters 8 and 9. For the code which is used as an example, SAW filter 8 should match the 3 bit code, and SAW device 9 should match the 7 bit code. The filters are of the form 5 and 6 shown in FIG. 1, and the principles of operation are described in more detail in the aforenoted SCIENTIFIC AMERICAN and IEEE publications.

The outputs of SAW devices 8 and 9 are individually connected to one of the inputs of individual summers 10 and 11, each of which can be an operational amplifier having a summing input, for example. The output of summer 10 is received at terminal A, and the output of summer 11 is received at terminal B.

Each of the outputs of summers 10 and 11 are connected to individual inputs of a summer 12. The sum output of summer 12 is obtained at terminal C.

It should be noted that in place of summer 12, it may be preferable in some applications to substitute a signal multiplier.

A delay means 13 is also connected between the output of summer 10 and a second input thereof. The capacity of the delay means is equal to the total period of the code which is matched by SAW device 8. For example, the 3 bit SAW filter interleaved with the 7 bit code has one of its bits spaced alternatively with each bit of the 7 bit code, and consequently each bit appears every two bit spaces. Consequently to delay one complete 3 bit code period, the capacity of the delay means 13 must be 6 bits.

Similarly, the output of summer 11 is connected to a delay means 14 which has its output connected to a second input of summer 11. The capacity of delay means 14 is sufficient to delay the entire period of the 7 bit code. Since each bit of the 7 bit code appears every second bit (since it is interleaved with the 3 bit code), delay means 14 has a capacity of 14 bits.

The delay means 13 and 14 can be constructed of a number of types of devices, such as SAW devices, analog delay lines, etc.

A dump control 115 is connected to the delay means 13 and dump control 116 is connected to the delay means 14.

Dump control circuits 115 and 116 are similar to that described with reference to FIG. 16 in the publication COHERENT FREQUENCY SYNTHESIZER TECHNIQUES STUDY by A. G. Burke, et al, Magnavox Company, prepared for Rome Air Development Center, March 1974, available from National Technical Information Service, U.S. Department of Commerce, Springfield, Va. The dump controls each operate a switch which open circuits the circuit paths through the corresponding delay lines.

In operation, the phase shift keyed signal 1 is applied to the input lead 7 which is connected to both input transducers of SAW filters 8 and 9. The spacing and form of the sensing finger pairs of each of the SAW filters are such that each filter is a match to the proper binary signal. Accordingly the amplitude of the output of SAW device 8 increases in synchronization with the reception of the 3 bit code portion of the interleaved signal, and the output of SAW device 9 reacts in amplitude when the 7 bit code to which it is matched is received.

The individual signals are applied to summers 10 and 11, and the outputs are obtained at terminals A and B.

However, the individual output signals are also delayed by the period of reception of the respective codes and are reapplied to different inputs of the respective summers 10 and 11. Accordingly there results coherent addition of the individual signals. As the individual signals continuously loop from the output of summers 10 and 11, through the delay means 13 and 14 and are reapplied to summers 10 and 11, the output amplitudes of the correlation peaks continuously increase with the reception of the respective input codes.

Figure 3:
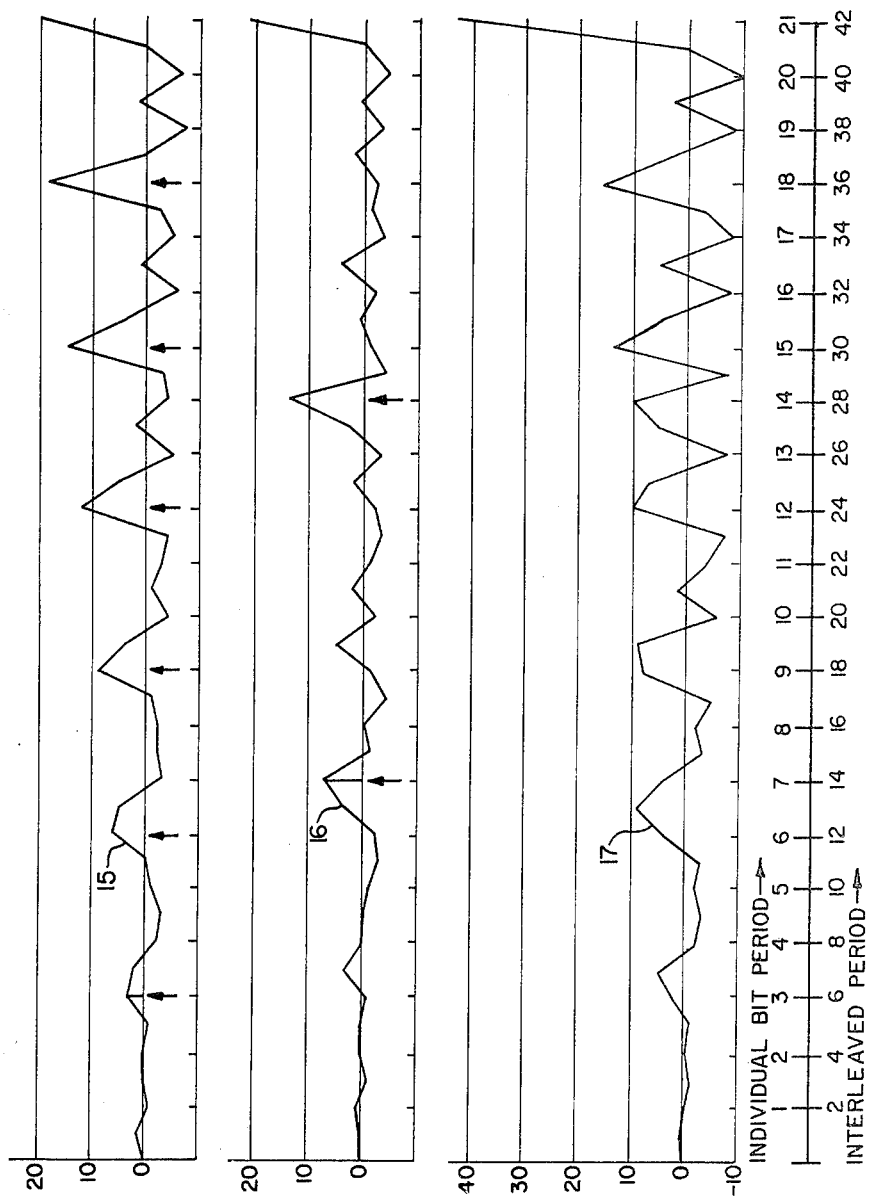
FIG. 3 depicts waveforms of the output signals of the structure of FIG. 2.

The effect of this increase is shown in FIG. 3. Waveform 15 shows that effect of the recirculated autocorrelation for the 3 bit code, and is measurable at terminal A of FIG. 2. It should be noted that every sixth bit period there is an amplitude peak, in synchronism with the completion of reception of each code period, with the peaks continuously increasing in amplitude, since an additional received signal is added to the previous sum. Seven peaks (corresponding to 7 receptions of the 3 bit code) are shown.

Waveforms 16 show the corresponding output signal amplitude of summer 11 at terminal B. It will be noted that a significant signal amplitude increase is obtained every time the complete 7 bit code has been received, every 7 bit period. Three complete periods are shown, for a total of 21 bits of that specific code (within the time period of reception of 42 bits).

It will be recalled that the 21 bits of each of the two codes form the 42 bit interleaved code. Where noise is received, it is added incoherently and does not sum as do the individual signals and thereby a signal enhancement is achieved.

Once the peaks have been exceeded, it is necessary to bring the amplitude of the signal within the circulating loop to 0. At this time a dump control signal is applied from the external peak detecting circuitry to dump control circuits 115 and 116, which causes the delay line transmission path to open for the period of the corresponding code sequence. During this time the summers 10 and 11 add 0 to the incoming signal, and accordingly the output signal consists of only the incoming signal.

The output signals of summers 10 and 11 are summed in summer 12, and the resulting signal is obtained at terminal C. The output signal of terminal C in amplified form is shown in FIG. 3 as waveform 17 which is a one-sided sign-preserving illustration of an autocorrelation function. The actual output signal from a SAW structure or a CCD structure will appear different in detail. Since the individual 3 and 7 bit code peaks of waveforms 15 and 16 do not coincide except after the 3 bit code has been repeated 7 times and the 7 bit code has been repeated 3 times, the signals generally do not sum except at the 21 (or 42 interleaved) bit point. It will be noted that the peak at the 21 bit point is substantially higher in amplitude than either of the peaks of the 3 or 7 bit code waveforms, and substantially higher in amplitude than any of the preceding peaks of the individual sums.

The transmitted codes are chosen, for best operation, so that the number of bits of the larger code is not an integral product of the smaller code.

Either of the simplified waveforms 15 or 16 is typical of the prior art form of a matched filter with a recirculating autocorrelator. It should be noted that each successive amplitude peak is increased over the preceding, in a linear manner. For a large number of recirculations, e.g., 50, there is little difference between successive recirculated peaks. Accordingly a threshold for recognizing the existence of a peak (i.e. signifying the reception of the signal) could be falsely or prematurely exceeded should a noise pulse be coincidentally impressed upon a peak point prematurely.

Yet the sum waveform 17 has a peak which is substantially higher than preceding peaks. Accordingly, a threshold can be established which will be more reliably exceeded by the final peak of waveform 17 at the proper time.

Alternatively, thresholds could be set in the individual correlator arms to detect the threshold exceeding a given value, for instance in FIG. 3, of 21 units. The threshold for detection could be for example, 15 units. The system would look for simultaneity in exceeding the threshold of 15 units in both arms, which would occur only when the 42nd interleaved (or 21st individual bit) has been completed. This coincidence can thus be used as the criteria for detection of reception of the 42 bit code.

With the provision of the signal having waveform 17 at terminal C, a gate can be enabled which itself enables transmission gates connected to terminals A and B to receive the signals from terminals A and B (i.e. the signals A and B may be received at this time). Logic circuitry can then determine whether the signals at A and B (or indeed the signal at C) is representative of a 1 or 0, signifying a bit of a further hidden code which is to be received.

For example, signal 1 of FIG. 1 can be used to transmit a "0" and the reverse code, which is time reversed from signal 1, can be used to transmit a "1". FIG. 2 shows circuitry required for receiving a "0". Additional processing circuitry, including circuitry for processing a "1" would be obvious to a person skilled in the art understanding this invention.

It should be noted that the invention is not limited to the interleaving of 2 codes, and that a plurality of interleaved codes can be utilized. While previously the reception of a long code required the use of an extremely long SAW filter, such as filter 2 of FIG. 1, if a long code is generated by the interleaving of a plurality of short codes, the present invention requires merely the paralleling of SAW filters which are each responsive to one of the code components of the interleaved code as filters 5 and 6 of FIG. 1, with the filter fingers appropriately spaced to receive the corresponding matched code at the proper time in the interleaved sequence. For instance, if 3 interleaved codes were used, each of the filters would have the finger sensor pairs spaced triple the distance between the finger sensor pairs of a single code SAW filter.

It should be noted that the SAW filter arrangement described with reference to FIG. 1 can be used to generate interleaved codes, rather than to merely receive them. For example with respect to SAW filters 5 and 6 in FIG. 1, a suitable electrical stimulation is made to each SAW device causing each of the SAW filters to generate the appropriate codes. These are interleaved in time, by external circuitry, not part of this invention.

Further, other kinds of delay line matched filters than SAW filters can be used. For instance, each of the filters can be analog tapped delay lines using various technologies such as charge coupled devices. Where a charge coupled device in the form of an analog tapped delay line is used, for the example described above, one tapped delay line should have 6 bit capacity and the other tapped delay line should have 14 bit capacity. The 6 bit capacity tapped delay line should be output tapped every second bit and the 14 bit shaft register should be output tapped every second bit. The output of the tapped portion of the delay lines become the signals which are combined by circuitry not part of this invention to reconstruct the signals, and are applied to summers 10 and 11.

In the event the filters used are shift register devices, they should have capacities similar to the tapped delay lines noted above.

It should be noted that it is possible to implement a version of the charge coupled or shift register type correlators by using the odd numbered taps, for example, for one sequence and even numbered taps for the other sequence. A tapped analog delay line suitable for use in this invention is available as type TAD-32 from Reticon Corporation.

Implementation of the shift register and delay line forms of the invention will become evident to a person skilled in the art understanding this invention, and therefore it is believed unnecessary to describe these embodiments further.

The invention provides a significantly increased reliability of reception of the forms of signals described, at significantly decreased cost from what would otherwise be required for reception. Furthermore, the reliability of the recovery of spread spectrum signals or signals buried in substantial noise is considerably enhanced. Codes can now be "hidden" in noise to a substantially increased extent, which decreases considerably the possibility of the unauthorized recovery of the coded signal.

A person skilled in the art understanding this invention may now conceive of alternatives, variations and other embodiments using similar principles. All are considered within the sphere and scope of this invention as defined in the appended claims.

The embodiments of the invention in which an exclusive property or privilege is claimed are defined as follows:

1. Apparatus for translation of an interleaved binary coded signal, said signal comprising a plurality of individual signals, said apparatus comprising a plurality of matched binary code filters adapted to receive the interleaved signal in parallel, each filter being matched to one of the individual signals, and means for summing the output signals of each of the matched filters to produce said translated signal.

2. Apparatus for processing a phase shift or frequency shift keyed signal comprised of interleaved repeating digital code sequences, comprising a plurality of delay line type matched filters, each filter being matched to one of the digital code sequences, means for applying the signal to all of the filters in parallel, and means for receiving the output signals from the filters upon the simultaneous exceeding of a predetermined amplitude threshold from all of the filters.

3. Apparatus as defined in claim 2, further including first means for summing the output of said filters and for providing a signal upon the summed output of the filters exceeding a predetermined threshold.

4. Apparatus as defined in claim 3, further including a plurality of second summing means, each having a first input and an output, connected in the signal path between the output of a corresponding filter and the first summing means, and further signal delay means connecting the output of each of the second summing means to a further input of the same second summing means, each of the further signal delay means having an internal delay of the period of the interleaved binary code sequence to which the corresponding filter is matched.

5. Apparatus as defined in claim 4, further including means for sensing the output of the first summing means simultaneously exceeding a predetermined common or individual threshold, and in response thereto, for stopping the passage of signal through the signal delay means.

6. Apparatus as defined in claim 4, in which each of the filters is a surface acoustic wave filter having a capacity and form to match the binary code sequence period to be matched.

7. Apparatus as defined in claim 4, in which each of the filters is a charge coupled device having a capacity to match the period of the binary code sequence to be matched.

8. Apparatus as defined in claim 4, in which each of the filters is a shift register having a capacity to match the period of the binary code sequence to be matched.

9. Apparatus as defined in claim 2, further including multiplying means, and a plurality of summing means each of said summing means corresponding to one of said plurality of filters, each of said summing means having first and second inputs and an output, said first input and output connected in the signal path between the output of said corresponding filter and the multiplying means, and a plurality of signal delay means each connected between the output of said corresponding summing means and said second input of said corresponding summing means, each of the signal delay means having an internal delay equal to the period of the interleaved binary code sequence to which the corresponding filter is matched, the means for multiplying being adapted to multiply the outputs of the summing means and for providing a signal when the multiplied output of the summing means exceeds a predetermined threshold.

10. Apparatus for indicating the presence of a binary coded compound signal comprised of a plurality of interleaved binary coded individual signals, comprising a plurality of surface acoustic wave filters, each matched in capacity and physical and electrical layout to an individual one of the binary coded signals, means for applying the binary coded compound signal to all the filters together, individual summing means each having an input connected to the output of a corresponding filter, individual delay means connecting the output of each of the summing means to a second input of the same summing means, the delay means being adapted to delay translation of a signal therethrough for the period of the binary coded individual signal matched by the corresponding filter; and a further summing means for summing the output signals of the individual summing means.

11. Apparatus for translation of phase or frequency shift keyed interleaved binary coded signals comprising a first surface acoustic wave filter having pairs of fingers physically located, spaced and of the form as to match the binary components of one of the coded signals of the interleaved coded signal, a second surface acoustic wave filter, having pairs of fingers spaced similarly but shifted physically from those of said first filter and matching the binary components of another of the coded signals of the interleaved coded signal, and means for applying said signal to both said filters in parallel, whereby parallel decoding of each of the interleaved signals is obtained.

12. Apparatus as defined in claim 11, including first and second summing means having first inputs individually connected to the respective outputs of each of the filters, and individual delay line means having inputs connected to the outputs of the respective summing means and outputs connected to second inputs of the corresponding summing means, the capacity of each of the delay line means being equal to the number of bits in the code to which the corresponding filter is matched multiplied by the number of individual code sequences in the interleaved binary coded signal to be translated.

13. Apparatus as defined in claim 12, including a further summing means having inputs connected to the outputs of the first and second summing means and an output for providing an indication of the presence of the interleaved binary coded signals upon a predetermined signal threshold level being exceeded.

* * * * *

UNITED STATES PATENT AND TRADEMARK OFFICE
CERTIFICATE OF CORRECTION

PATENT NO. : 4,234,930
DATED : November 18, 1980
INVENTOR(S) : Russell Campbell

It is certified that error appears in the above-identified patent and that said Letters Patent are hereby corrected as shown below:

In column 4, line 64, delete "alternatively" and insert therefor --alternately--.

In column 5, line 55, delete "receptions" and insert therefor --repetitions--.

Signed and Sealed this

Twelfth Day of May 1981

[SEAL]

Attest:

RENE D. TEGTMEYER

Attesting Officer

Acting Commissioner of Patents and Trademarks